US007139981B2

(12) United States Patent
Mayer, III et al.

(10) Patent No.: US 7,139,981 B2
(45) Date of Patent: Nov. 21, 2006

(54) MEDIA MANAGEMENT SYSTEM

(75) Inventors: Theodore Mayer, III, Valley Village, CA (US); Su Wen Wang, Walnut, CA (US)

(73) Assignee: Panoram Technologies, Inc., Sun Valley, CA (US)

( * ) Notice: Subject to any disclaimer, the term of this patent is extended or adjusted under 35 U.S.C. 154(b) by 641 days.

(21) Appl. No.: 10/170,871

(22) Filed: Jun. 13, 2002

(65) Prior Publication Data

US 2003/0020763 A1   Jan. 30, 2003

Related U.S. Application Data

(60) Provisional application No. 60/297,973, filed on Jun. 13, 2001.

(51) Int. Cl.
  G06F 3/048   (2006.01)
  G09G 5/12    (2006.01)

(52) U.S. Cl. ............ 715/771; 715/717; 715/769; 715/835; 715/716

(58) Field of Classification Search ............ 715/717, 715/716, 718, 719, 835, 769, 730, 771
See application file for complete search history.

(56) References Cited

U.S. PATENT DOCUMENTS

| | | | | |
|---|---|---|---|---|
| 4,974,073 | A * | 11/1990 | Inova | 348/38 |
| 5,136,390 | A * | 8/1992 | Inova et al. | 348/383 |
| 5,388,264 | A * | 2/1995 | Tobias et al. | 715/500.1 X |
| 5,990,884 | A * | 11/1999 | Douma et al. | 715/716 |
| 6,115,022 | A * | 9/2000 | Mayer et al. | 345/418 |
| 6,421,692 | B1 * | 7/2002 | Milne et al. | 715/716 X |
| 6,930,730 | B1 * | 8/2005 | Maxon et al. | 715/717 X |
| 6,944,825 | B1 * | 9/2005 | Coco et al. | 715/716 |

OTHER PUBLICATIONS

AMX Synergy Client/Server, Educational Resource Management, Software, Mar. 1996, AMX Corporation, Dallas Texas.
AMX Synergy Client/Server, Corporate Resource Management, Software, Jun. 1996, AMX Corporation, Dallas, Texas.
VTX Video Teleconferencing System, Instruction Manual, Preliminary, Mar. 1997, AMX Corporation, Dallas, Texas.
Synergy Server Resource Management System (Version 2.0 or higher), Instruction Manual, Apr. 1997, Panja Inc., Richardson, Texas.
VPXpress ViewPoint System Design/Programming Software (Version 1.1) Instruction Manual, Mar. 2001, Panja Inc., Richardson, Texas.
IRLIB Infrared Library Management Program (Version 2.01 or higher) Instruction Manual, Apr. 2001, Panja Inc., Richardson, Texas.

* cited by examiner

Primary Examiner—Raymond J. Bayerl
(74) Attorney, Agent, or Firm—Christie, Parker & Hale, LLP

(57) ABSTRACT

A process of configuring a media facility is provided. A source icon representing at least one media source is generated. Then, characteristics of the media source is encrypted in the source icon including settings and recalls for all devices in the signal path. Further, a media space representing an output device is generated. Then, characteristics of the output device is encrypted in the media space. The source icon and the media space are presented, for example, on a display system, to a user for selection. The user may select the source icon and apply it to the media space including settings and recalls for all devices in the signal path, for example, through dragging and dropping. Once the media source, the output device and/or other devices in the signal path between them have been configured, the user may store the configuration for a later recall.

26 Claims, 5 Drawing Sheets

FIG. 4 IMMERSIVE VISUALIZATION SYSTEM DIAGRAM

MEDIA MANAGEMENT SYSTEM

CROSS-REFERENCE TO RELATED APPLICATION(S)

The present application claims priority of the U.S. Provisional Application No. 60/297,973 filed Jun. 13, 2001 entitled "Media Management System," the contents of which are fully incorporated by reference herein.

FIELD OF THE INVENTION

The present invention is related to media management, and particularly to a method and apparatus for a menu-driven system for directing audio/video sources to sound/display systems.

BACKGROUND

Today, complex, media rich environments such as visualization centers, command and control facilities, emergency response centers, media auditoriums, planning centers and even media based conference rooms are becoming more and more commonplace and complex.

It is typical in these media environments that many media sources, including complex multi-channel media sources and output devices become part of the user's information mix and thus a new type of media control system is required to route and configure the complex media components.

Sources may include one or more of various computers, VCRs, cable and satellite feeds, audio sources, DVD players, video servers, cameras, sensors, MP3 players, microphones, and more, many of which could be multi-channel sources.

The outputs devices may include one or an array of video projectors, monitors, flat panels, control monitors, audio systems, televisions, LCDs (liquid crystal displays), PDPs (plasma display panels), and more. This becomes a very complex management matrix quickly as users require the ability to send each media source component to any output device or array with impunity.

Each media source typically has particular characteristics including the number of horizontal and vertical pixels, the image frame rate, the analog or digital nature of the signal, image processing device settings, associated audio source, and with multi-channel computer, video or audio sources, how many channels the source is comprised of.

Each output device in the signal chain typically also has particular characteristics which can include multiple inputs as well as adjustments to the type of signal that is sent to it. Often the output device has to have multiple recall memories for multiple signal types.

Any media source should be compatible with the display characteristics or audio characteristics of the output device and all devices in the signal chain should be adjusted.

A single command center could have dozens of display and audio playback systems being fed by dozens of sources.

It is common to use a device called a matrix switcher which allows any input to be routed to any output electronically. These matrix switchers can be very large with an array of combination possible. A 16 input by 16 output matrix switcher for video and audio offers over 65,000 combinations. As stated above, if some sources and some displays are multi-channel systems with additional component(s) in the signal chain, the selection of proper combinations becomes very confusing and complex.

The problem becomes exacerbated when the users of these systems are not media experts, but simply users who wish to get a result. Bringing a multi-channel computer onto a multi-channel display may comprise a sequence such as:
1. Route output 1 from the computer to the left screen;
2. Route output 2 from the computer to the center screen;
3. Route output 3 from the computer to the right screen;
4. Route output 2 from the computer to the control monitor;
5. Switch the left screen projector to the correct signal preset;
6. Switch the center screen projector to the correct signal preset;
7. Switch the right screen projector to the correct signal preset;
8. Route the audio from the computer to the main sound system;
9. Set the volume control of the audio to the proper level;
10. Modify the signal processing recall of output 1 (for systems such as edge blending);
11. Modify the signal processing recall of output 2 (for systems such as edge blending); and
12. Modify the signal processing recall of output 3 (for systems such as edge blending).

Exemplary edge blending systems are described in U.S. Pat. No. 4,974,073 entitled "Seamless Video Display," U.S. Pat. No. 5,136,390 entitled "Adjustable Multiple Image Display Smoothing Method and Apparatus" and U.S. Pat. No. 6,115,022 entitled "Method and Apparatus for Adjusting Multiple Projected Raster Images," the contents of each of which are incorporated by reference herein.

And it could go on to more complexity if at the same time other systems needed to be turned off or if the computer needs to be reset into a special mode.

In the past, one would assist the user in achieving results more simply by providing a computer control for the various components and then scripting complex sequences into presets. This scripting limits the user to ideas that have been pre-agreed on and thus programmed. Such conventional control systems with pre-configured scripting are available, for example, from AMX Corporation, Richardson, Tex.

SUMMARY

In an exemplary embodiment according to the present invention, a method of configuring a media facility is provided. The method includes: generating a first icon representing at least one media source; encrypting characteristics and appropriate recalls and settings for all devices in the signal chain of said at least one media source in the first icon; generating a second icon representing an output device; encrypting characteristics and appropriate recalls and settings for all devices in the signal chain of the output device in the second icon; displaying the first and second icons on a display device; selecting the first icon; and applying the selected first icon to the second icon.

In another exemplary embodiment according to the present invention, a media management system suitable for configuring a media facility is provided. The media management system includes: a media source; an output device; and an integration system coupled to the media source and the output device, said integration system comprising a display device capable of displaying a first icon representing the media source and a second icon representing the output device, wherein a user is capable of encrypting characteristics of the media source in the first icon and characteristics of the output device in the second icon, and wherein the user configures the media facility by selecting the first icon and applying it to the second icon.

In yet another exemplary embodiment according to the present invention, an integration system suitable for configuring a media facility is provided. The integration system includes: a display device suitable for displaying at least one first icon representing a media source and at least one second icon representing an output device; an input device suitable for selecting said at least one first icon and applying it to said at least one second icon; and a storage device suitable for storing a configuration the media source and the output device.

BRIEF DESCRIPTION OF THE DRAWINGS

These and other aspects of the invention can be understood by reference to the following detailed description, taken in conjunction with the accompanying drawings, which are briefly described below.

DETAILED DESCRIPTION

An integration system in an exemplary embodiment according to the present invention, which may be referred to herein as the Integrator 2000, simplifies the scripting and the management of these complex media facilities. The concept is based around intelligent icons. The integration system may include intelligence components embodied in software, firmware, hardware, or any combination thereof.

Figure 1:
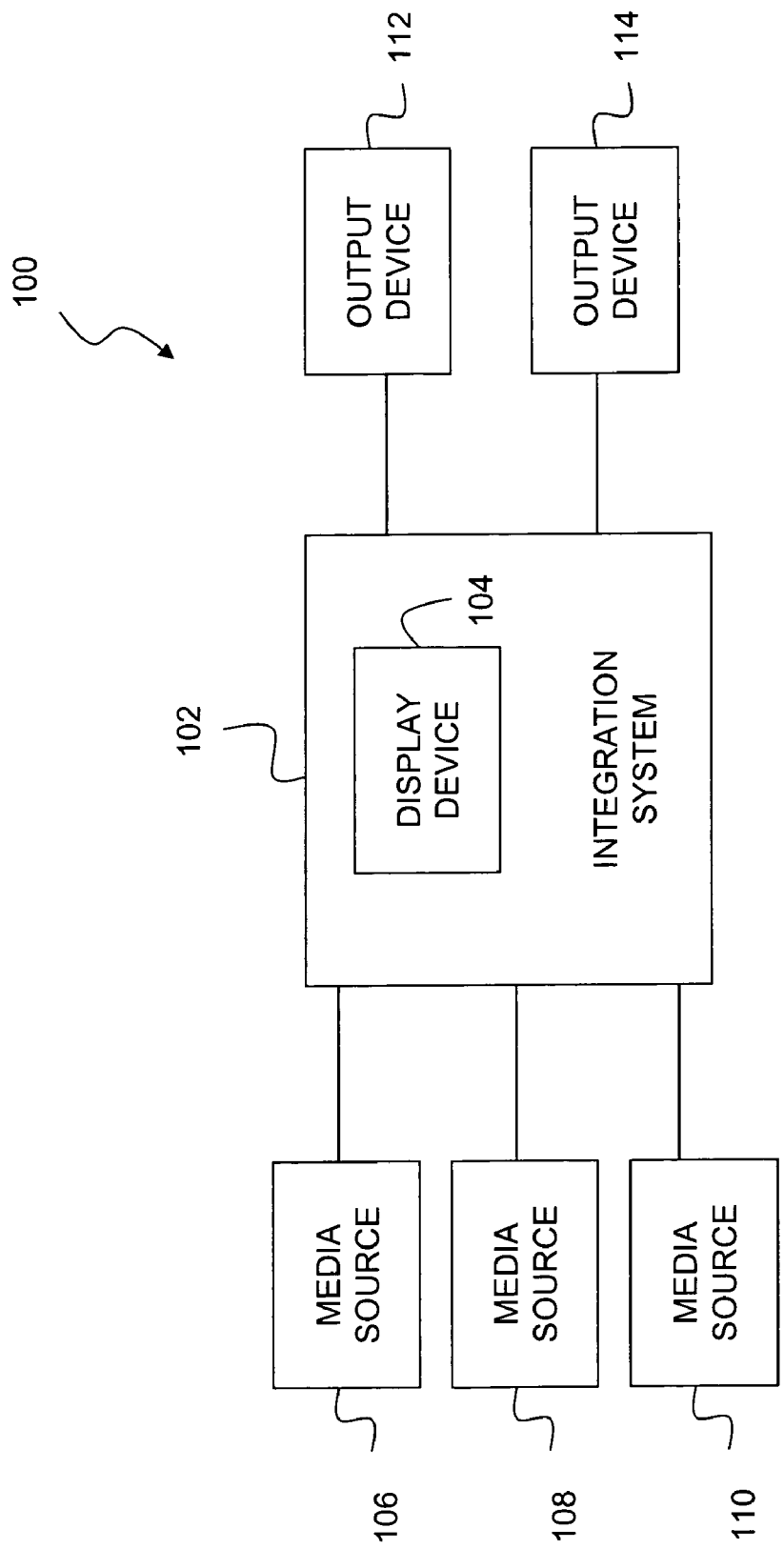
FIG. 1 is a system diagram of media management system in an exemplary embodiment according to the present invention.

FIG. 1 is a system diagram of a media management system (which may also be referred to as a media control system) 100 in an exemplary embodiment according to the present invention. The media management system 100 includes an integration system 102, which is capable of coupling a plurality of media sources 106, 108 and 110 to a plurality of output devices 112 and 114. The integration system 102 includes a display device 104 for displaying (or presenting), for example, icons that represent media sources and output devices. The integration system 102 may also include one or more matrix switchers for coupling the media sources to the output devices and/or one or more image processors (e.g., picture-in-picture processor, edge blender, image scaler, image warper, etc.).

The icons that represent the media sources 106, 108 and 110 should be intelligent source icons. The source icons, generated in step 200 of FIG. 2, in the exemplary embodiment have encrypted in them source characteristics as indicated in step 202. The source characteristics may include, for example, the nature of the source's output signals, the number of channels of the source, frequency of operation, frame rate, location of plugging into a matrix switcher, its associated audio source, location of plugging of the associated audio source into the matrix switcher, normal volume settings for the audio, signal processing recalls used for that source, and other related information.

The icons that represent the output devices 112 and 114 should also be intelligent output icons. These output icons may also be referred to as media spaces, display icons or screen icons. The output icons, generated in step 204 of FIG. 2, in the exemplary embodiment have encrypted in them output characteristics as indicated in step 206 of FIG. 2. The output characteristics for the output devices 112 and 114 may include, for example, plugging locations into the matrix switcher outputs, normal preset selections for specific input signal characteristics, location of audio system outputs for a particular device, projector settings, and other related information.

Figure 2:
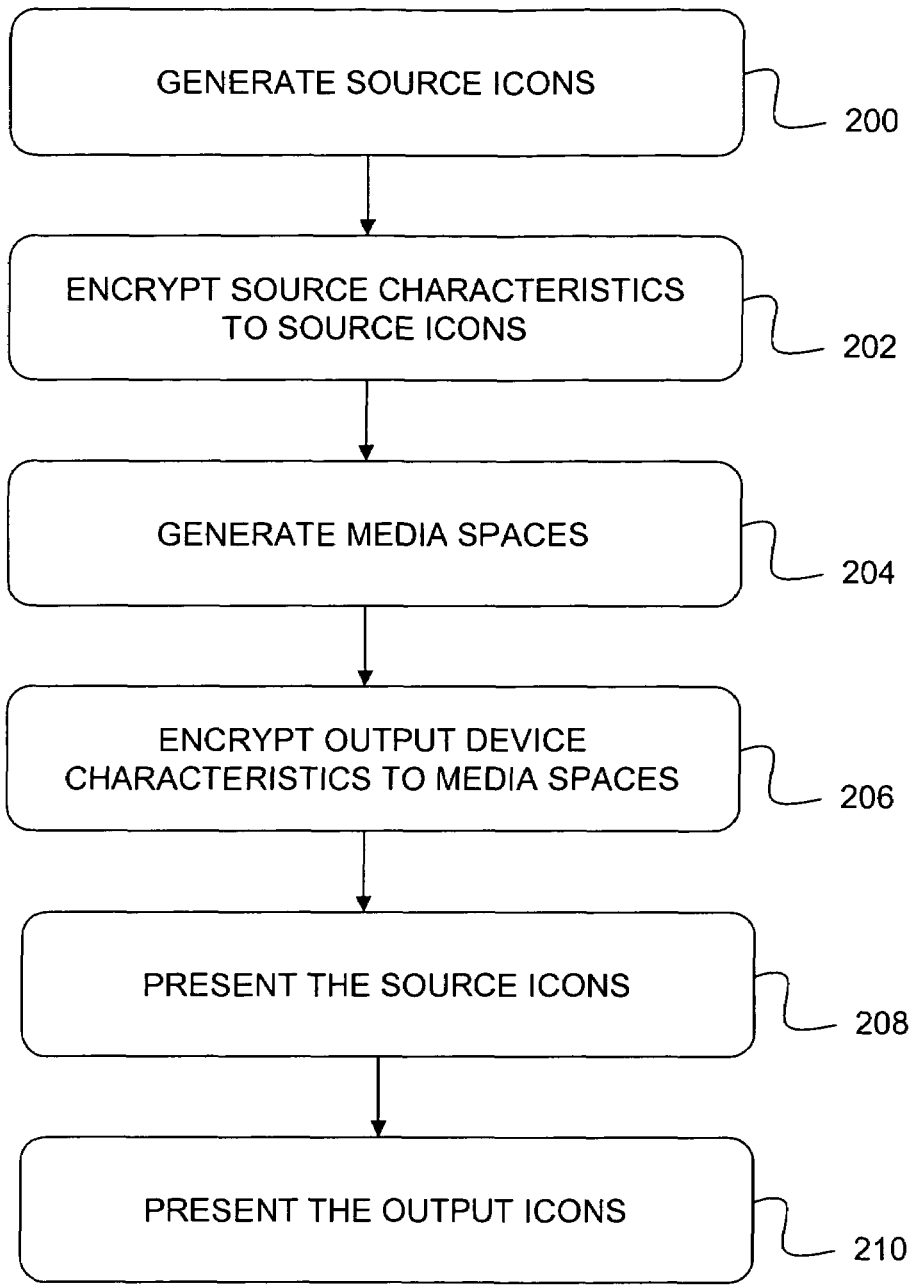
FIG. 2 is a flow diagram of a process of encrypting and displaying a source icon and a media space.

As indicated in steps 208 and 210 of FIG. 2, respectively, the source and output icons are displayed (or presented) on the display device 104. With all these characteristics defined as part of the intelligent icons, it is possible to drag and drop a source icon onto an output icon and the integration system 102 knows exactly the scripting sequence required to present that source on that output device. The output icons (or media spaces) may be a graphical representation of the display device or the entire facility itself. For example, an output icon corresponding to a three monitor system may actually include graphics depicting three monitors. Therefore, on the display device of the integration system, media spaces may look similar to the layout of the physical system itself, graphical representation of display screens, and/or sound systems.

As discussed earlier, characteristics encrypted in the source icons and the media spaces are not just for external control, but they may be for controlling all the devices in the signal path. Hence, when a source icon is dragged and dropped onto a media display space, not only the media source and the target display device are configured, but all the devices in the signal path between them are configured as well. In order to support configuration of devices in the signal path, the characteristics of these devices may also be encrypted in the source icon and/or the media space.

The components of the system in the signal path may include one or more of, but not limited to, matrix switchers, image processors, projectors, audio systems, etc. Image processors may include a picture-in-picture processor, an edge blender, an image scaler, an image warper, etc.

Further, the configuration of the system components in the signal path may include, for example, display configurations, audio configuration, projector configurations and switcher configurations. In the exemplary embodiments, the configuration of the system components are also realized through encrypting all the characteristics in the source icons and media spaces. In a sense, the exemplary embodiment provides a user programming method, with which a user of a media management system is empowered to flexibly program a media management system via a GUI (graphical user interface).

Therefore, exemplary embodiments according to the present invention provide for a user to essentially program the facility himself or herself. The underlying source and output characteristics may be configured by the system/software vendor, however, it is the user that actually configures the facility to meet his or her needs. This way, the users are empowered to manage complex systems themselves using an instinctive, simple system. Using conventional systems, they have typically relied on pre-programmed solutions. The GUI of the present invention has empowered the user to do a great deal of programming without having to deal with actual complexities of coding and setting component configurations.

In other embodiments, a configuration module is provided, which a user has access to, and with which a user can configure a new source or output device and create a new source or output icon for it. Further, the user has an ability to encrypt the characteristics of the new source or output in the source or output icon.

The integration system may be used in a standardized facility setting so that the users are capable of easily memorizing where devices or components of the system are located. In other embodiments, tool kits may be provided to the user so that the user may be able to build his or her own graphics representation of the facility to be displayed in accordance with the facility setting that the user has configured.

Figure 3:
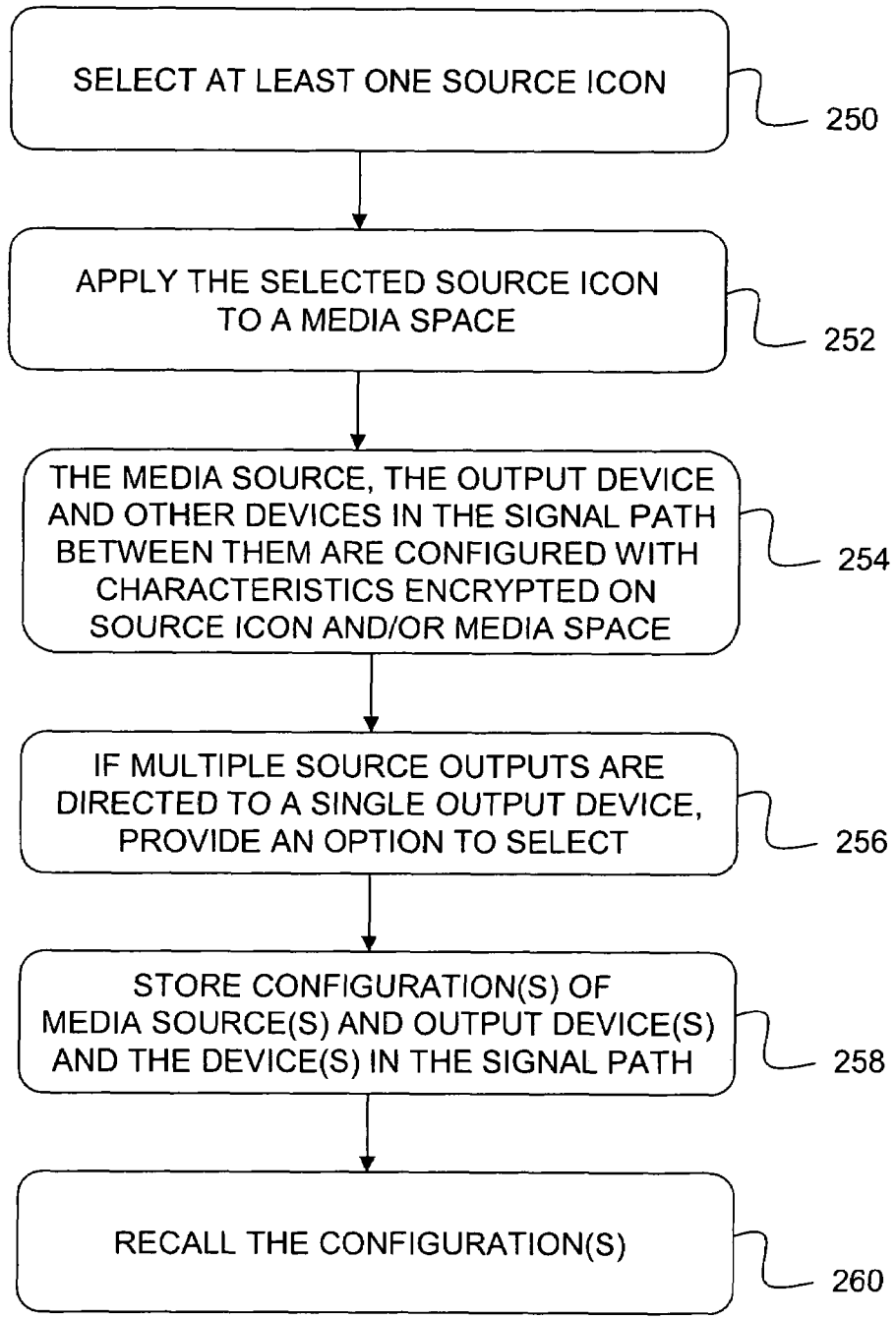
FIG. 3 is a flow diagram of a process of configuring media sources and output devices, and storing the configuration.

In steps 250 and 252 of FIG. 3, at least one source icon is selected and applied to an output icon. In step 254, the media source, the output device and other devices in the signal path between them are configured with characteristics encrypted on the source icon and/or the media space.

For example, if a multi-channel graphics computer source icon is dragged (selected and applied) onto the output icon for a multi-channel, edge blended display—the integration system's intelligence automatically knows to route the correct source signal to the correct output, select the correct projector recall for that signal, select the normally associated audio for that source and route it to the display audio system, route the correct source channel to the control monitor, and select the correct recall setting for any signal processing device such as, for example, edge blending or signal compatibility processors.

All the user has done in this case is to drag the source icon onto the output icon and the result is that the source appears on the screen that it has been dragged onto—all formatted correctly.

In certain cases, however, multiple source outputs may be directed to a single output device as indicated in step 256 of FIG. 3. In such cases, a user should be provided with an option to select one of the multiple source outputs as also indicated in step 256. For example, a three channel multi-channel source icon may be dropped onto a single screen control monitor icon. In this case, the system intelligence says—there are three possible outputs that the user may want to present on this single control monitor, a set of selection buttons should be added below the monitor to allow the user to select which of the three channels to view.

If a single channel source icon were to be dropped onto the same control monitor icon, it would not require the selection buttons and therefore they would not appear.

All these intelligent attributes put the control of the media environment back to the user's hands instead of sequence programmers who must otherwise program presets.

This is carried further—particularly in complex environments where the user may have dropped various sources onto various displays—they each appear and behave on the associated display as expected—but the entire room configuration may take a number of drag and drop actions. Once the entire media room is configured exactly as the user wants it, with various sources formatted to the various outputs, the user can click on a snapshot button which captures are the variable of the configuration and saves them under a snapshot name. Thus, as indicated in step 258 of FIG. 3, one or more configurations of media source(s), output device(s) and the device(s) in the signal path between them may be stored. Further, as indicated in step 260, the configurations can be recalled. In essence the entire configuration is saved and can then be quickly re-invoked by selecting the appropriate snapshot. When a number of configurations are stored in a single snap shot, the resulting configuration may be referred to as a combination configuration.

Furthermore, once the user has created a set of named snapshots, they may wish to sequence those snapshots into an order that is suitable for a presentation or another reason requiring a sequence of presets.

For this the snapshots can be dragged into a sequencer window which allows the step by step access to the snapshot configurations in the order they have been laid out. New or same snapshots may repeat as needed.

This sequence can then be stepped forward or backward manually, random selected, or stepped based on time of day, a pre-timed sequence or selected based on any variety of external conditions.

Thus the combination of intelligent source icons, intelligent output icons, snapshots and sequencer, and any sub-combination thereof, provides a new type of media management control that is unique and intuitive and easy for the user to operate.

Figure 4:
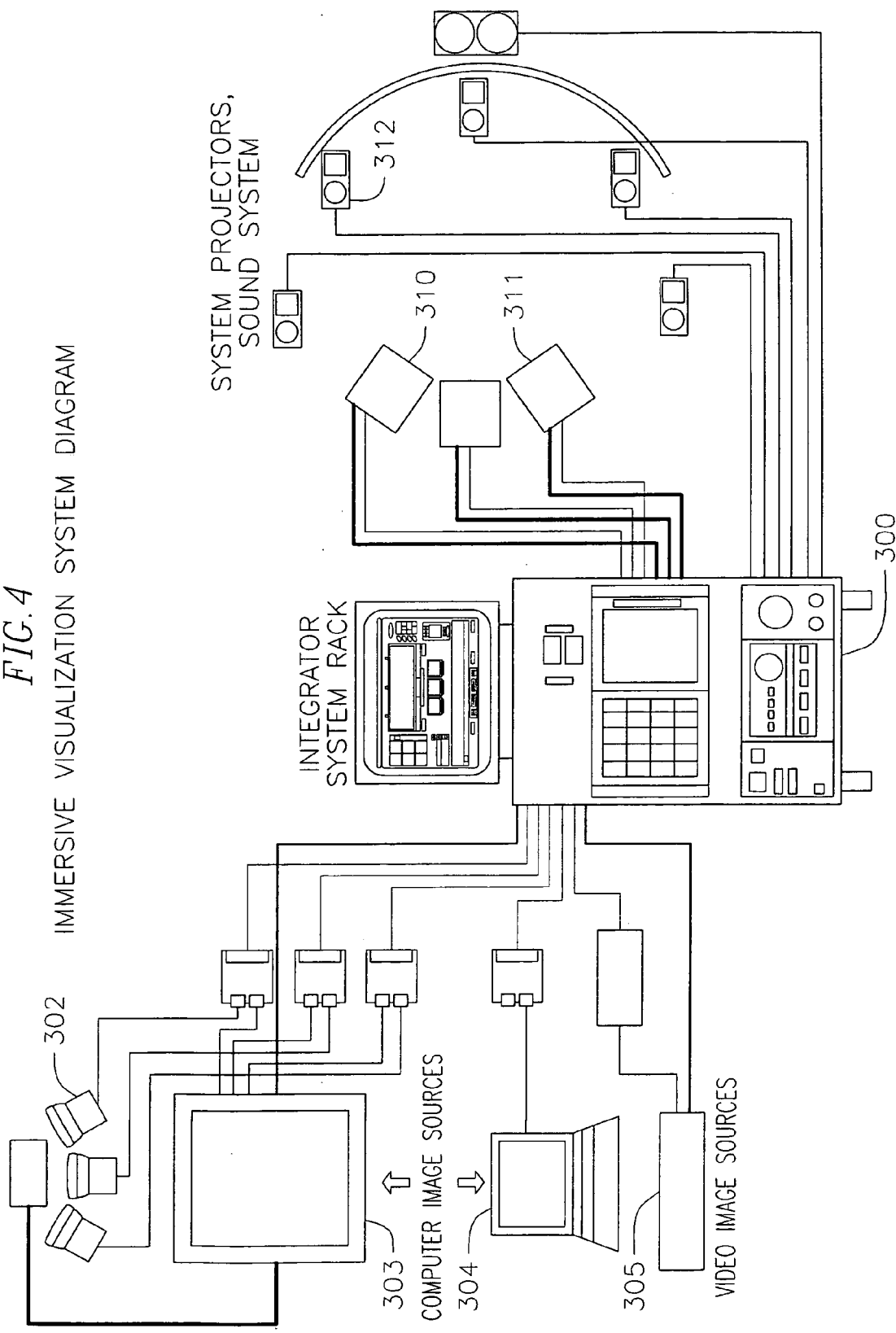
FIG. 4 is a system diagram of a media management facility.

FIG. 4 is a system diagram of a media management facility in one exemplary embodiment. The media integration system 300 has inputs from media sources 302, 303, and 304, 305 and outputs to output devices 310, 311, and 312.

Figure 5:
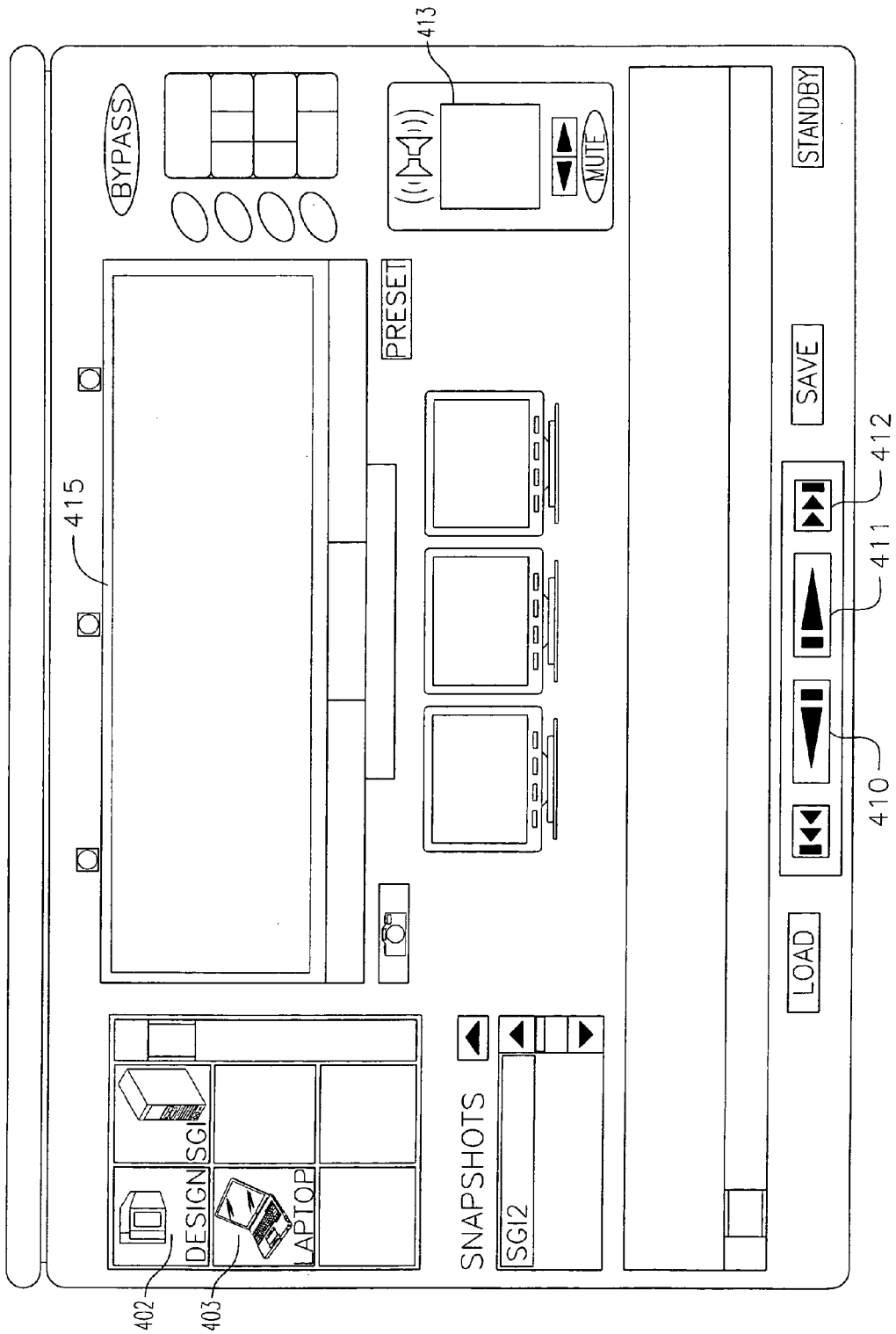
FIG. 5 is a screen shot of the main control screen for a media integration system.

FIG. 5 is a screen shot of the main control screen for a media integration system in one exemplary embodiment. Source library icons 402, 403 represent media sources. Output control icons, namely, a projector control screen object 415 and an audio control icon 413, represent output devices. In the described embodiment, the projector control screen object 415 represents the screen on which images are projected. By clicking, dragging, and releasing the source library icons onto the projector control screen object 415, users can program what they want to see, where they want to see it. Sequencer control buttons 410, 411 and 412 allow the users to display snapshots in order.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

We claim:

1. A method of configuring a media facility having at least one media source, an output device, and a media integration system, the method comprising:

generating a first icon representing the at least one media source, the at least one media source having an output adapted to be coupled to an input of the output device through the media integration system;

encrypting characteristics of said at least one media source by a user in the first icon;

generating a second icon representing an output device;

encrypting characteristics of the output device by the user in the second icon;

displaying the first and second icons on a display device;

selecting the first icon; and applying the selected first icon to the second icon to provide the output of the at least one media source to the input of the output device through the media integration system.

2. The method according to claim 1, further comprising encrypting characteristics of a system component in a signal path between said at least one media source and the output device in at least one of the first and second icons.

3. The method of claim 1, wherein said at least one media source comprises at least one selected from a group consisting of video and audio sources.

4. The method of claim 1, wherein the at least one media source comprises at least one selected from a group consisting of a computer, a VCR, a cable feed, a satellite feed, a DVD player, a video server, a video camera, a sensor and a television.

5. The method of claim 1, wherein the at least one media source comprises at least one selected from a group consisting of an audio server, an MP3 player, a microphone, a cassette player and a radio.

6. The method of claim 1, wherein selecting comprises dragging the first icon, and applying comprises dropping the first icon onto the second icon.

7. The method of claim 1, wherein the output device comprises at least one selected from a group consisting of a video projector, a monitor, a flat panel, an audio system, a television, an LCD (liquid crystal display) and a PDP (plasma display panel).

8. The method of claim 1, further comprising:
a) generating a plurality of third icons, each third icon representing one of a plurality of media sources;
b) encrypting characteristics of one of the media sources to the third icon that represents it;
c) generating a plurality of fourth icons, each icon representing one of a plurality of output devices;
d) encrypting characteristics of one of the output devices to the fourth icon that represents it;
e) displaying the third and fourth icons on a display device;
f) selecting one of the third icons;
g) applying the selected one of the third icons to one of the fourth icons; and
h) repeating f) and g) until a desired combination configuration is realized, in which all desired third icons have been selected and applied to the fourth icons.

9. The method of claim 8, further comprising storing the desired combination configuration.

10. The method of claim 9, further comprising recalling the stored desired combination configuration.

11. The method of claim 8, further comprising repeating a)–f) to realize a plurality of desired combination configurations and storing the desired combination configurations.

12. The method of claim 11, further comprising recalling said desired combination configurations in a sequence.

13. The method of claim 8, further comprising encrypting characteristics of system components in a signal path between said media sources and the output devices onto at least one of the icons.

14. A media management system suitable for configuring a media facility, said system comprising:
a media source;
an output device; and
an integration system coupled to the media source and the output device, said integration system comprising a display device capable of displaying a first icon representing the media source and a second icon representing the output device,
wherein the system is adapted to allow a user to encrypt characteristics of the media source in the first icon and characteristics of the output device in the second icon, and
wherein the system is adapted to allow the user to configure the media facility by selecting the first icon and applying it to the second icon to provide that an output of the media source is coupled to an input of the output device through the integration system.

15. The media management system of claim 14, further comprising at least one device in a signal path between the media source and the output device,
wherein the system is adapted to allow the user to encrypt characteristics of said at least one device in at least one of the first and second icons.

16. The media management system of claim 14, wherein the media source comprises at least one selected from a group consisting of video and audio sources.

17. The media management system of claim 14, wherein the media source comprises at least one selected from a group consisting of a computer, a VCR, a cable feed, a satellite feed, a DVD player, a video server, a video camera, a sensor and a television.

18. The media management system of claim 14, wherein the media source comprises at least one selected from a group consisting of an audio server, an MP3 player, a microphone, a cassette player and a radio.

19. The media management system of claim 14, wherein the system is adapted to allow the user to select the first icon and to apply it to the second icon by dragging the first icon and dropping it onto the second icon.

20. The media management system of claim 14, wherein the output device comprises at least one selected from a group consisting of a video projector, a monitor, a flat panel, an audio system, a television, an LCD (liquid crystal display) and a PDP (plasma display panel).

21. The media management system of claim 14, wherein the display device displays a plurality of third icons, each representing and encrypted with characteristics of one of a plurality of media sources, and a plurality of fourth icons, each representing and encrypted with characteristics of one of a plurality of output devices,
wherein the system is adapted to allow the user to select one of the third icons and to apply it to one of the fourth icons until a desired combination configuration is realized, in which all desired third icons have been selected and applied to the fourth icons.

22. The media management system of claim 21, wherein the system is adapted to allow the user to store the desired combination configuration.

23. The media management system of claim 22, wherein the system is adapted to allow the user to recall the stored desired combination configuration.

24. The media management system of claim 21, wherein the system is adapted to allow the user to realize and store a plurality of desired combination configurations.

25. The media management system of claim 24, wherein the system is adapted to allow the user to recall the desired combination configurations in a sequence.

26. An integration system suitable for configuring a media facility, said integration system comprising:
a display device suitable for displaying at least one first icon representing a media source and at least one second icon representing an output device;
an input device suitable for selecting said at least one first icon and applying it to said at least one second icon, the input device being adapted for a user to use the input device to encrypt characteristics of the media source in said at least one first icon and to encrypt characteristics of the output device in said at least one second icon; and
a storage device suitable for storing a configuration for providing an output of the media source to an input of the output device trough the integration system.

* * * * *